Nov. 8, 1960 C. A. STEBBINS ET AL 2,959,447
REAR COMPARTMENT COVER FOR CONVERTIBLE
Filed June 30, 1958 5 Sheets-Sheet 1

INVENTORS
Edward G. Podolan &
BY Charles A. Stebbins

W. S. Pettigrew
ATTORNEY

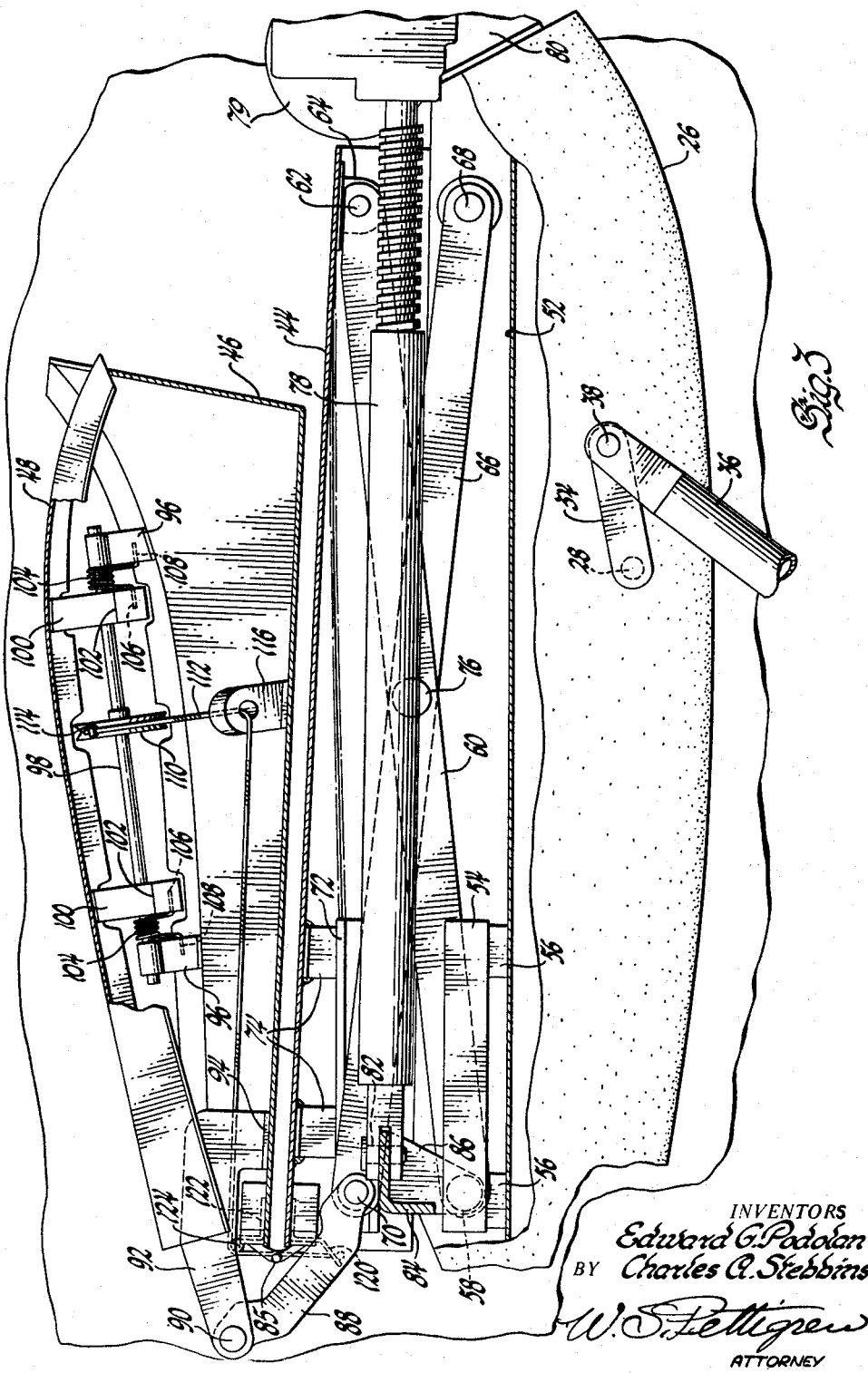

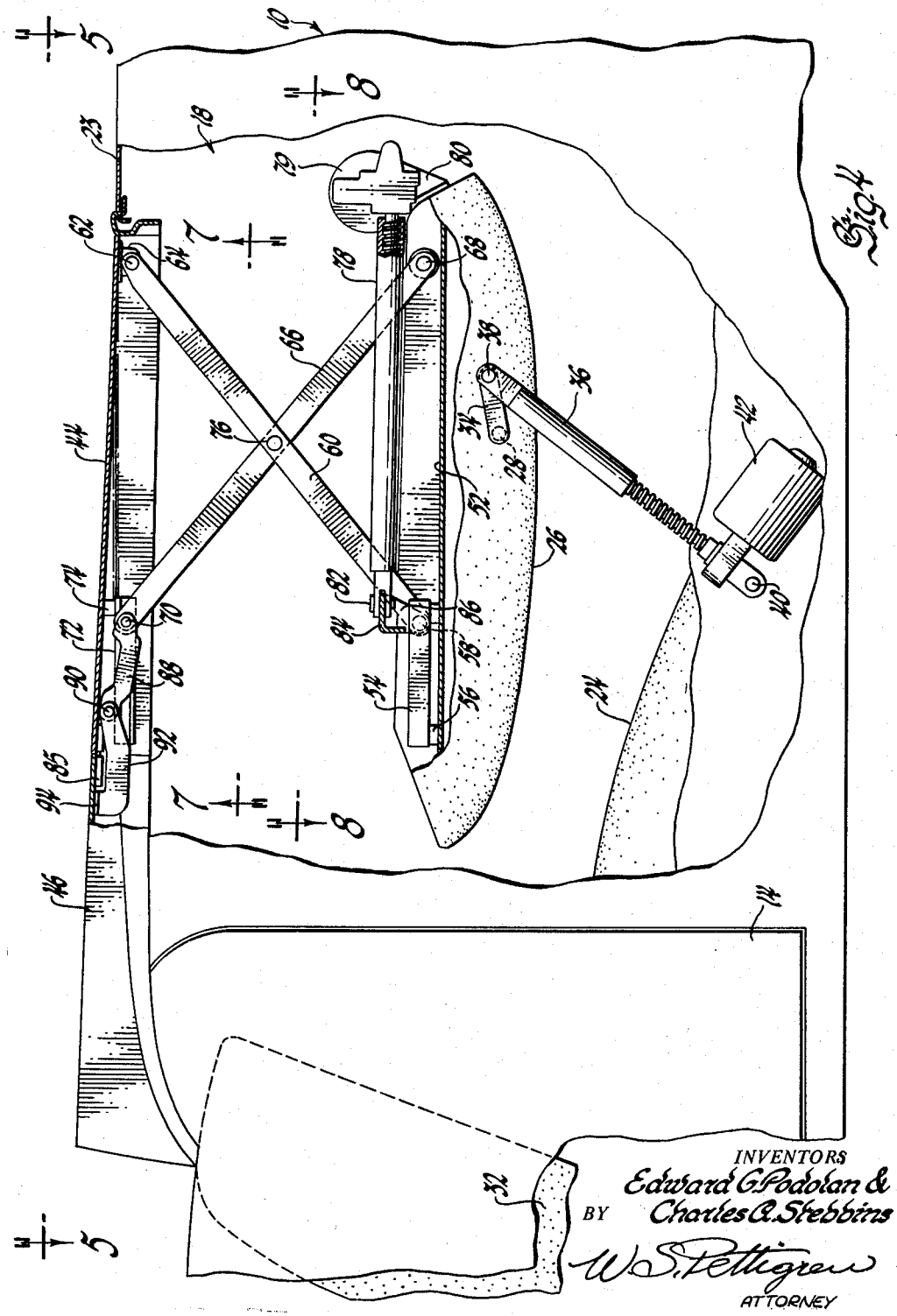

Nov. 8, 1960     C. A. STEBBINS ET AL     2,959,447
REAR COMPARTMENT COVER FOR CONVERTIBLE
Filed June 30, 1958     5 Sheets-Sheet 4
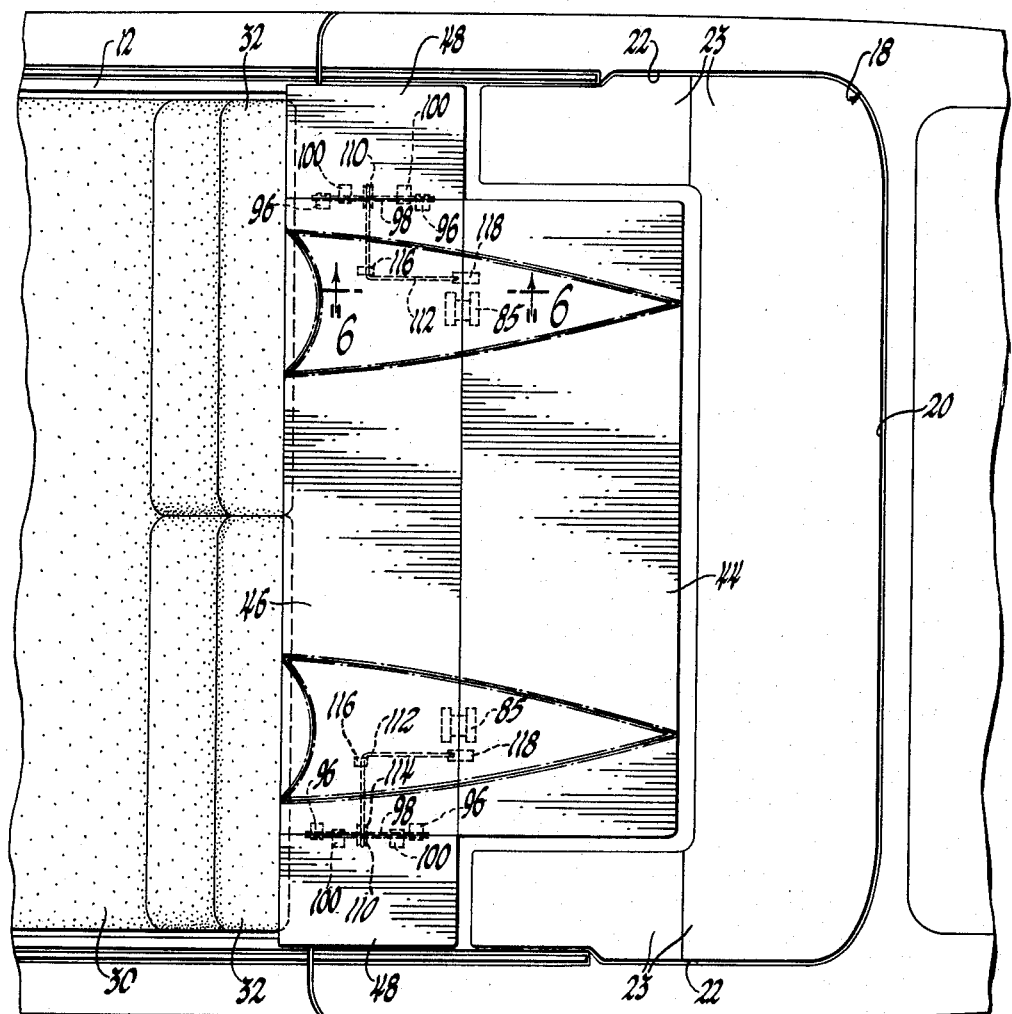
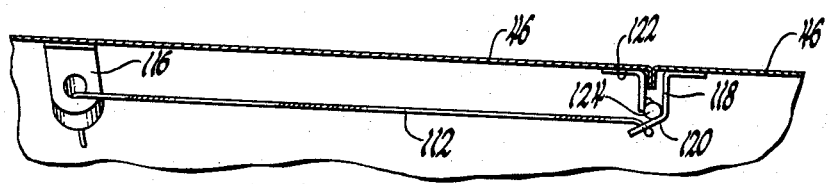
INVENTORS
Edward C. Podolan &
BY Charles A. Stebbins
W. S. Pettigrew
ATTORNEY

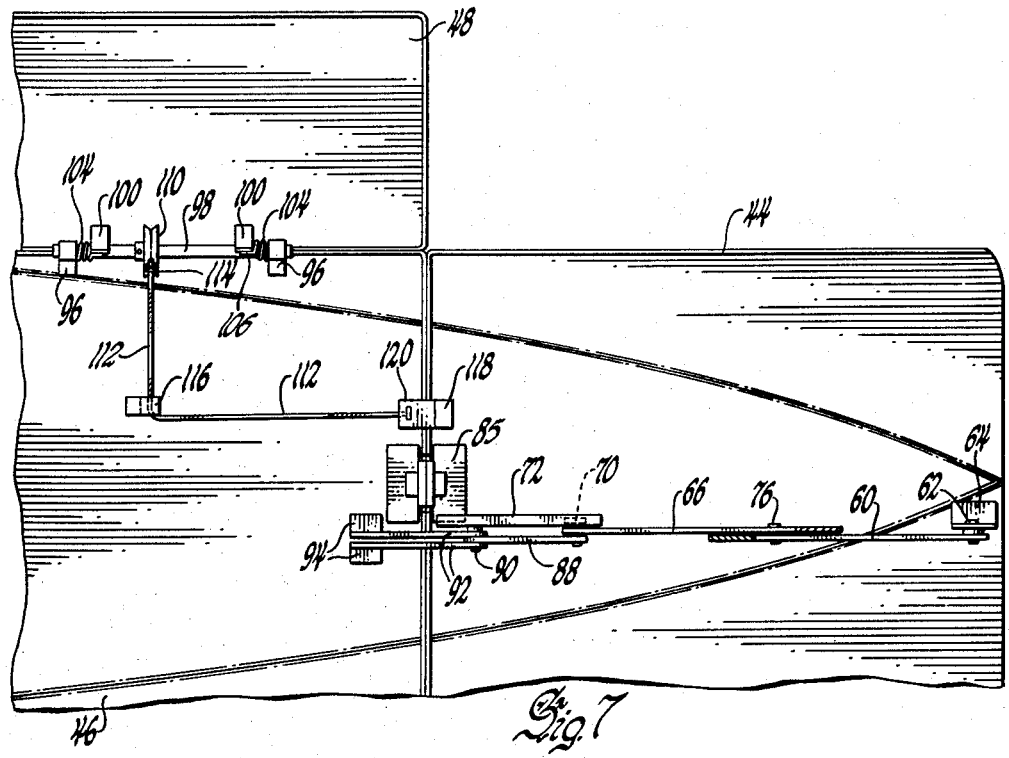
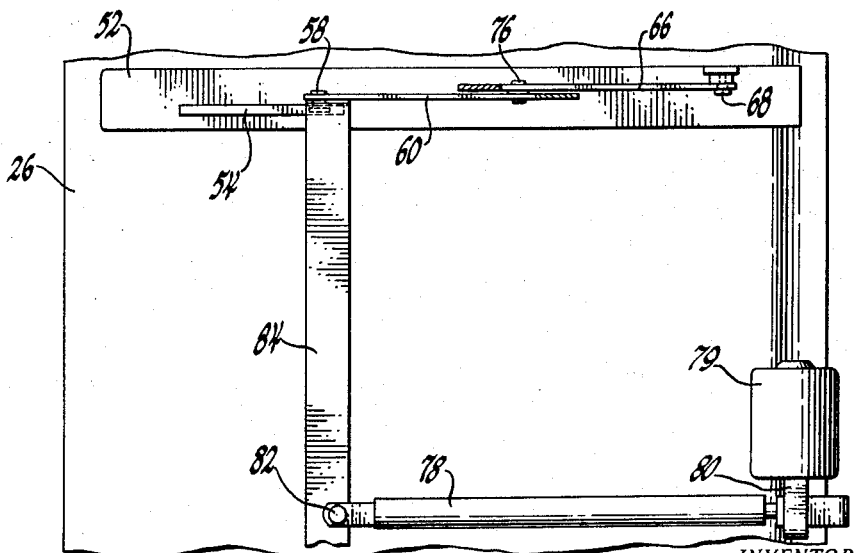

United States Patent Office 2,959,447
Patented Nov. 8, 1960

2,959,447

REAR COMPARTMENT COVER FOR CONVERTIBLE

Charles A. Stebbins, Birmingham, and Edward G. Podolan, St. Clair Shores, Mich., assignors to General Motors Corporation, Detroit, Mich., a corporation of Delaware Filed June 30, 1958, Ser. No. 745,581

7 Claims. (Cl. 296—65)

This invention relates to convertible automobiles and more particularly to a rear compartment cover for closing the space between a convertible automobile top well and the front seat back when the convertible top is in a lowered position to thereby convert the automobile to a roadster.

The usual convertible automobile includes a passenger compartment having a front seat and a rear seat, with the rear seat being disposed immediately forward of and adjacent the forward wall of the transverse portion of the top well and between the forwardly extending side portions of the top well. When the convertible top is in a lowered position, the top fits within the top well so that the body is open. The rear compartment cover of this invention is intended primarily for use with such bodies and particularly when the body is open. By bridging the space between the top well and the front seat back, the cover of this invention continues the rear deck contour of the body forwardly to the front seat back so that the body appears as a two passenger or roadster type of automobile.

The cover of this invention includes a pair of hinged foldable main panels adapted to be disposed in an unfolded aligned position to bridge the space between the forward wall of the transverse portion of the top well and the front seat back and further includes a pair of side panels which are hinged to the forwardly disposed main panel and are adapted to be swung outwardly thereof to bridge the space between the front seat back and the forwardly extending side portions of the top well. The panels are power operated and are interconnected for coordinating the folding movement thereof, with the panels and the operating mechanism therefor being supported on the rear of the rear seat back. The rear seat back is mounted on the body for tilting movement and when the seat back is upright and the panels are in their folded position, the panels are disposed rearwardly of the rear seat back within the top well out of sight.

The primary object of this invention is to provide an improved convertible vehicle body including a rear compartment cover including a plurality of rigid foldable panels adapted to entirely close the space between the convertible top well and the rear of a front seat back when the convertible top is in a lowered position to thereby carry the rear deck contour of the body forwardly to the front seat back. Another object of this invention is to provide an improved rear compartment cover for convertible type vehicle bodies with the cover including a tiltable rear seat back, a plurality of rigid foldable panels and power operating means therefor mounted on and being movable between a folded position within the top well when the seat back is in an upright position and an unfolded position wherein the panels entirely close the space between the top well and the front seat back when the rear seat back is in a tilted position.

These and other objects of this invention will be readily apparent from the following specification and drawings wherein:

Figure 3 is an enlarged view of a portion of Figure 2;

Figure 4 is a partial side elevational view of the body, partially broken away, showing the rear compartment cover in an unfolded position and closing the space between the convertible top well and the front seat back when the convertible top is in a lowered position;

Figure 5 is a partial plan view of the body taken generally along the plane indicated by line 5—5 of Figure 4 showing the rear compartment cover in an unfolded position;

Figure 6 is a sectional view taken along the plane indicated by line 6—6 of Figure 5;

Figure 7 is a view taken along the plane indicated by line 7—7 of Figure 4; and

Figure 8 is a view taken along the plane indicated by line 8—8 of Figure 4.

Figure 1:
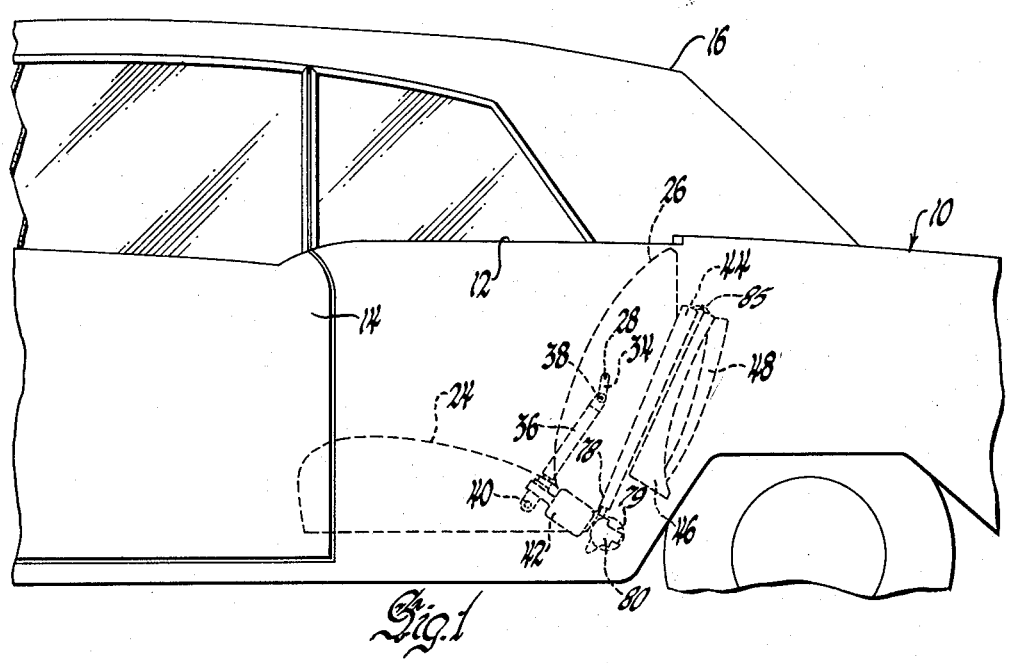
Figure 1 is a partial side elevational view of a convertible type vehicle body having a rear compartment cover according to this invention, with the cover being shown in a stored out-of-the-way position rearwardly of the tiltable rear seat back within the convertible top well.

Referring now particularly to Figure 1 of the drawings, a convertible vehicle body 10 includes a passenger compartment 12, a front door 14 on either side thereof to obtain access to the passenger compartment, and a foldable convertible top 16 of known type which is movable between a raised position as shown in Figure 1 of the drawings and a lowered position, not shown, wherein the top is stored within a convertible top well 18, Figure 5, disposed rearwardly of the passenger compartment. The convertible top well 18 is generally of U-shape when viewed in plan and includes a portion 20 extending transversely of the body and a pair of side portions 22 extending forwardly of the body from either end of the portion 20. If desired, the opening of the top well may be closed by a plurality of panels 23 providing a top well compartment cover when the top is in a lowered position. Such a top well cover is disclosed in application Serial No. 690,771, Gilson et al., filed October 17, 1957, and assigned to the assignee of this invention.

Figure 2:
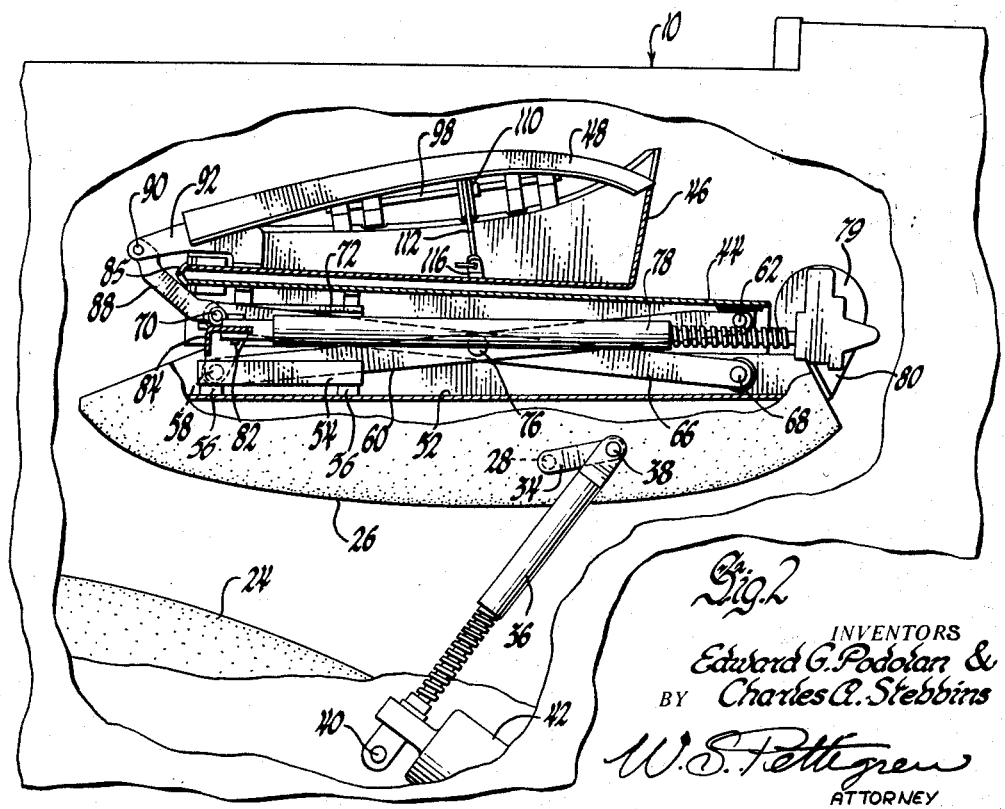
Figure 2 is a view, partially broken away, showing the rear seat back in a forwardly tilted position.

The passenger compartment 12 includes a rear seat having a fixed seat cushion 24 and a tiltable seat back 26 pivoted at 28 at either side thereof to the interior side walls of well portions 22 for movement between a normal upright position, as shown in Figure 1, wherein the seat back is located immediately forward of the transverse portion 20 of the top well and between the side portions 22 thereof and a tilted position, as shown in Figures 2 and 4, wherein the seat back is disposed forwardly over the seat cushion 24. The body 10 also includes a front seat, Figure 5, which includes a seat cushion 30 and a pair of tiltable seat backs 32.

The rear seat back 26 is power operated for movement between its normal upright position and its tilted position and this will now be described with reference particularly to Figures 1 and 2 of the drawings. An operating lever 34 is fixedly secured to each of the pivot pins 28 which swingably mount the seat back on the interior side panels of well portion 22. One end of an extendable and retractable screw jack 36 is pivoted at 38 to lever 34 and the other end of screw jack is pivotally secured to the interior side panels of well portions 22 at 40. The screw jack 36 includes an electric motor 42 for extending and retracting the screw jack. When the screw jacks 36 are retracted from their position as shown in Figures 2 and 4 of the drawings to their position as shown in Figure 1 of the drawings, the levers 34 will be swung clockwise as viewed from the left-hand side of the body to swing the seat back rearwardly from its tilted position to its upright position, and likewise upon extension of the screw jacks from their position of Figure 1 to their position shown in Figures 2 and 4, the levers 34 will be swung counterclockwise, as viewed from the left-hand side of the body, to swing the seat back forwardly from its upright to its tilted position. Preferably, screw jacks 36 and levers 34 are disposed within well portions 22 out of sight.

The rear compartment cover of this invention includes a pair of foldable main panels 44 and 46 and a pair of like side panels 48. When the cover is in an unfolded position as shown in Figure 5 of the drawings, it will be seen that the panels 44 and 46 are aligned and close the space between the forward wall of the transverse portion of the top well and the upper edge portions of the front seat backs 32, and that the side panels 48 close the space between the forwardly extending portions 22 of the top well and the upper edge portions of the front seat backs. The panels 44 and 46 are power operated for movement between an unfolded position, as shown in Figure 5, and a folded position, as shown in Figures 2 and 4, wherein the panel 46 is disposed above the panel 44, and the side panels 48 include operating means coordinating folding movement of these panels with panels 44 and 46 so as to move panels 48 between an unfolded position, as shown in Figure 5, and a folded position, as shown in Figures 2 and 3, wherein the panels 48 are disposed above and within the panel 46.

The power operated means controlling the folding movement of the panels 44 and 46 are disposed adjacent each side edge portion of the panels and the rear seat back 26 and are of like construction. Therefore, only one such power operated means will be described and it will be understood that the other is of like construction. Likewise, the operating means coordinating folding movement of the side panels 48 with panels 44 and 46 is the same for each panel 48 and, therefore, only one such operating means will be described and it will be understood that the other is of like construction.

Referring now particularly to Figures 2, 3 and 8 of the drawings, the right-hand power operating means for panels 44 and 46 will be described. A sheet metal channel 52 is fitted within the rear of the seat back 26 adjacent the right-hand edge thereof. An outwardly opening guide channel 54 is located within the channel 52 adjacent the forward or upper end thereof and is secured thereto by a pair of brackets 56 which are welded to the base of channel 52 and to one leg of the channel 54. A guide roller 58 is slidably and rotatably mounted within channel 54 and is pivotally secured to one end of a scissors link 60. The other end of the scissors link 60 is pivoted at 62 to a bracket 64 which is secured to the interior surface of the panel 44 adjacent the rear edge thereof. Another scissors link 66 has one end thereof pivoted at 68 to the outer wall of channel 52 and the other end of the link is pivoted to a guide roller 70 which is slidably and rotatably mounted within an inwardly opening guide channel 72 of the same construction as the guide channel 54. Channel 72 is fixedly secured to the interior surface of panel 44 adjacent the forward edge thereof by a pair of brackets 74 which are welded to the interior surface of the panel and to one of the legs of the guide channel. The scissors links 60 and 66 are pivoted to each other at 76 intermediate the ends thereof.

An extendable and retractable screw jack 78 operated by an electric motor 79 is disposed longitudinally of the body and generally centrally of the seat back 26, with one end of the screw jack being fixedly secured to the lower or rearward edge of the seat back by a bracket 80. The other end of the screw jack is pivotally secured at 82 to a bar 84 extending transversely of the seat back and including a depending arm 86 at each end thereof which is pivotally secured to the guide rollers 58. The panel 46 is hinged to the panel 44 by a spaced pair of hinges 85 of known type which allow the panel 46 to swing forwardly and downwardly or rearwardly and upwardly with respect to the panel 44. A link 88 is pivotally secured at one end thereof to the guide roller 70 and the other end of the link is pivoted at 90 to a pair of levers 92, Figure 7, each of which includes a laterally extending flange 94 fixedly secured to the panel 46 adjacent the rearward edge thereof. The link 88 and the levers 92 control folding movement of the panel 46 relative to the panel 44 as will be hereinafter described.

Referring now particularly to Figures 3 and 7 of the drawings, the operating means coordinating movement of the panels 48 with panels 44 and 46 will be described. A pair of hinge leaves 96 are secured to the panel 46 adjacent the side edge thereof. The hinge leaves 96 rotatably support a rod 98 which extends therebetween. A pair of brackets 100 are secured to the side panel 48 adjacent the inner side edge thereof and an intermediate portion of these brackets is offset at 102 and welded or otherwise fixedly secured to the rod 98. Thus, the rod 98 must rotate with the side panel 48. A coil torsion spring 104 is mounted on the rod 98 intermediate each hinge leaf 96 and bracket 100, with one end 106 of the spring bearing against the free end of the bracket 100 and the other end 108 of the spring bearing against the hinge leaf adjacent the mounted end thereof. The springs 104 continually bias the panel 48 outwardly of the panel 46 to its unfolded position as shown in Figures 5 and 7 of the drawings. A pulley 110 is fixedly secured to the rod 98 intermediate the brackets 100 and a cable 112 has one end thereof fixedly secured at 114 to the pulley 110. The cable extends generally transversely of the body, through a guide member 116 fixed to the panel 46 adjacent the side edge thereof, and then generally longitudinally of the body to an angular anchor bracket 118 which is fixedly secured to the panel 44 adjacent the forward edge thereof. As best shown in Figure 6 of the drawings, the anchor bracket 118 includes an angularly extending terminal flange 120 which is apertured so as to receive the other end of the cable 112 therethrough with this end of the cable thereafter being secured to the flange. An angle bracket 122 is secured to the panel 46 adjacent the rearward edge thereof and generally in longitudinal alignment with the anchor bracket 118. A pin 124 is fixedly secured to the free end of the bracket 122. Pin 124 fits within the junction of the angular flange 120 with the bracket 118 when panels 44 and 46 are disposed in an aligned position, and engages the cable 112 to shorten the effective length of the cable when the panels 44 and 46 are in a folded position, as best shown in Figure 3 of the drawings.

The operation of the rear compartment cover will now be described and it will be assumed that the cover is in an unfolded position as shown in Figures 4, 5, 7 and 8, and that it is desired to move the cover from this position to a folded position as shown in Figures 2 and 3 of the drawings. The folding movement of the panels 44 and 46 relative to each other will first be described and then the folding movement of the panels 48 relative to the panels 44 and 46 will be described since it is believed that the operation will be more clearly understood by this sequence.

When it is desired to fold the panel 46 relative to the panel 44, the screw jack 78 is operated so as to extend the screw jack from its position of Figure 4 to its position of Figure 3. As the screw jack is extended the bar 84 will be moved forwardly of the rear seat back 26 so that each of the guide rollers 58 will be moved forwardly within the channels 54. As the guide rollers move forwardly within the channels 54, the scissors links 60 and 66 will be folded relative to each other to lower the panels 44 and 46 within compartment 12 as guide rollers 70 move forwardly within the guide channels 72. As the panels 44 and 46 are lowered and the guide rollers 70 move forwardly, the links 88 will be moved forwardly of the body or outwardly of the panel 44 to fold panel 46 rearwardly over panel 44 by means of levers 92 and hinges 86 simultaneously with lowering movement of the panels 44 and 46 from their raised position as shown in Figure 4 to their lowered position as shown in Figure 3. When the panel 46 has been completely folded rearwardly over the panel 44 both panels will be disposed in a lowered position adjacent the rear of the rear seat back 26 as shown in Figure 3 of the drawings.

The operation of the operating means controlling the folding movement of the panels 48 relative to the panels 44 and 46 will now be described with reference particularly to Figures 3 and 6 of the drawings. When the panels 48 are in an extended position with respect to the panel 46, it will be remembered that the pin 124 fits within the junction of the angular flange 120 with the bracket 118 as shown in Figure 6 whereby the pin 124 is out of engagement with the cable 112. When the panel 46 starts to fold rearwardly over the panel 44, as previously described, the pin 124 will swing about the axis of the hinges 85 into engagement with the cable 112 so as to start to place a bend in the cable 112. This will cause the effective length of the cable 112 to be shortened so that the cable will rotate the pulley 110 and in turn rotate the shaft 98 against the action of the springs 104, which continually bias the panels 48 to their extended position. Since the brackets 100 are fixed to the panel 48 and also to the shaft 98, rotation of the shaft 98 by means of the pulley 114 will cause the panels 48 to be swung inwardly and below the panel 46 as the panel 46 swings rearwardly over the panel 44, and the panels 44 and 46 are being lowered from their position as shown in Figure 4 to their position as shown in Figure 3. When the panels 44 and 46 are in a folded lowered position with respect to the seat back 26, the panels 48 will be disposed in a folded position within the panel 46, as shown in Figure 3, to thereby completely fold the rear compartment cover. Thereafter, the screw jack 36 can be operated to move the seat back 26 to its normal upright position, whereby the rear compartment cover, in its folded position, will be moved within the convertible top well and out of sight.

If it is desired to move the rear compartment cover to an unfolded position, the seat back 26 will first be tilted forwardly by means of the screw jack 36, as previously described, to its position as shown in Figures 2 and 3 of the drawings. Thereafter, the screw jack 78 is operated so as to retract the screw jack and thereby extend the scissors links 60 and 66 to raise the panels 44, 46 and 48 with respect to the seat back 26. As the panels are raised, the guide rollers 70 will be moved rearwardly within the guide channels 72 so as to move the links 88 rearwardly from their position as shown in Figure 3 to their position of Figure 4 to thereby swing the panel 46 forwardly of the panel 44 about the hinges 85 into alignment therewith and engagement with the upper edge of the front seat backs 32. During unfolding movement of the panel 46 relative to the panel 44, the pins 124 will remain in engagement with the cables 112 to retain the panels 48 in a folded position with respect to the panel 46 until the panel 46 is substantially in alignment with the panel 44. Thereafter the pins 124 move out of engagement with the cable 112 to allow the springs 104 to rotate the shaft 98 and thereby swing the panels 48 outwardly of the panel 46 as the panel 46 moves into full alignment with the panel 44.

Thus, this invention provides an improved rear compartment cover for a convertible vehicle body including a plurality of rigid foldable panels adapted to entirely close the space between the convertible top well and the rear of the front seat back when the convertible top is in a lowered position and thereby carry the rear deck contour of the body forwardly to the front seat back. The convertible top cover includes a pair of main panels which are power operated for folding movement relative to each other and further includes a pair of side panels which are foldable relative to one of the main panels in combination with operating means coordinating the folding movement of the side panels with that of the main panels.

Although it is preferable that a top well cover be used with the rear compartment cover of this invention so that the body presents a substantially unbroken upper surface from the rear deck area to the front seat back, the top well cover need not be used with the rear compartment cover of this invention.

We claim:

1. In combination with a vehicle body having an open passenger compartment therein, a cover for said compartment comprising, a pair of hingedly interconnected main panels bodily movable between a lowered position within said compartment wherein said panels are located in folded relationship with respect to each other and a raised position within the opening of said compartment wherein said main panels are located in alignment with each other substantially flush with the adjacent upper body contour, first operating means mounted within said compartment and operatively connected to one of said panels for movement thereof between said raised and lowered positions within said compartment, second operating means interconnecting the other of said panels and said first operating means for folding and unfolding said other panel relative to said one panel during raising and lowering movement of said panels, a pair of side panels hingedly connected to said other panel for bodily movement therewith and folding movement with respect thereto between an aligned position wherein said side panels are located within the opening of said compartment substantially flush with the upper body contour and a folded position with respect thereto, and third operating means responsive to folding movement of said other panel with respect to said one panel for controlling folding movement of said side panels with respect to said other panel.

2. The combination comprising, a vehicle body having an open rear passenger compartment therein, a vehicle seat back swingably mounted within said compartment for movement between upright and tilted positions, a pair of hingedly interconnected panels bodily movable as a unit between a lowered position within said compartment wherein said panels are located in folded relationship with respect to each other and a raised position within the opening of said compartment wherein said panels are located in an unfolded aligned position with respect to each other substantially flush with the adjacent upper body contour, first operating means mounted on said seat back and operatively connected to one of said panels for movement of said panels between said raised and lowered positions within said compartment when said seat back is in said tilted position, and second operating means interconnecting the other of said panels and said first operating means for folding and unfolding said other of said panels relative to said one panel during raising and lowering movement of said panels.

3. In combination with a vehicle body having an open rear passenger compartment therein, a cover for said compartment comprising, a pair of hingedly interconnected panels bodily movable as a unit between a lowered position within said compartment wherein said panels are located in folded relationship with respect to each other and a raised position within the opening of said compartment wherein said panels are located in an unfolded aligned position with respect to each other substantially flush with the adjacent upper body contour, foldable linkage means including a pair of pivotally interconnected links, one having one end thereof pivotally mounted on said body and the other end thereof pivotally and slidably secured to one of said panels, the other having the corresponding one end thereof pivotally and slidably mounted on said body and the corresponding other end thereof pivotally mounted on said one of said panels to thereby move said panels between said raised and lowered positions within said compartment, and operating means interconnecting the other of said panels and said other end of said one link for folding and unfolding said other of said panels relative to said one panel during raising and lowering movement of said panels.

4. In combination with a vehicle body having an open passenger compartment therein, a cover for said compartment comprising, a pair of hingedly interconnected main panels bodily movable between a lowered position within said compartment wherein said panels are located in folded relationship with respect to each other and a raised position within the opening of said compartment wherein said panels are located in alignment with each other substantially flush with the adjacent upper body contour, first operating means mounted within said compartment and operatively connected to one of said panels for movement thereof between said raised and lowered positions within said compartment, second operating means interconnecting the other of said panels and said first operating means for folding and unfolding said other panel relative to said one panel during raising and lowering movement of said panels, a pair of side panels, hinge means including a hinge pin for swingably mounting said side panels on said other panel for bodily movement therewith and folding movement with respect thereto between an aligned position wherein said side panels are located within the opening of said compartment substantially flush with the upper body contour and a folded position with respect thereto, resilient means biasing said side panels to said aligned position thereof, and third operating means responsive to folding movement of said other panel with respect to said one panel for folding said side panels with respect to said other panel against the action of said resilient means.

5. In combination with a vehicle body having an open passenger compartment therein, a cover for said compartment comprising, a pair of hingedly interconnected main panels bodily movable between a lowered position within said compartment wherein said panels are located in folded relationship with respect to each other and a raised position within the opening of said compartment wherein said panels are disposed in alignment with each other longitudinally of said body and substantially flush with the adjacent upper body contour, first operating means mounted within said compartment and operatively connected to one of said panels for movement thereof between said raised and lowered positions within said compartment, second operating means interconnecting the other of said panels and said first operating means for folding and unfolding said other panel relative to said one panel during raising and lowering movement of said panels, a pair of side panels, means hingedly connecting each of said side panels to said other panel adjacent a respective side edge thereof for bodily movement therewith and folding movement with respect thereto between an aligned position wherein said side panels are located outboard thereof within the opening of said compartment substantially flush with the upper body contour and a folded inboard position with respect thereto, and third operating means responsive to folding movement of said other panel with respect to said one panel for controlling folding movement of said side panels with respect to said other panel.

6. In combination with a vehicle body having an open passenger compartment therein, a cover for said compartment comprising, a pair of hingedly interconnected main panels bodily movable between a lowered position within said compartment wherein said panels are located in folded relationship with respect to each other and a raised position within the opening of said compartment wherein said panels are located in alignment with each other substantially flush with the adjacent upper body contour, first operating means mounted within said compartment and operatively connected to one of said panels for movement thereof between said raised and lowered positions within said compartment, second operating means interconnecting the other of said panels and said first operating means for folding and unfolding said other panel relative to said one panel during raising and lowering movement of said panels, a pair of side panels, hinge means including a hinge pin for hingedly connecting each of said side panels to said other panel for bodily movement therewith and folding movement with respect thereto between an aligned position wherein said side panels are located within the opening of said compartment substantially flush with the upper body contour and a folded position with respect thereto, resilient means biasing said side panels to said aligned position, cable means interconnecting each of said side panels and said other panel, and means responsive to folding movement of said other panel with respect to said one panel for controlling the effective length of said cables to thereby control folding movement of said side panels with respect to said other panel.

7. In combination with a vehicle body having an open passenger compartment therein, a cover for said compartment comprising, a pair of hingedly interconnected panels bodily movable between a lowered position within said compartment wherein said panels are located in folded relationship with respect to each other and a raised position within the opening of said compartment wherein said panels are located in an unfolded aligned generally horizontal position with respect to each other and generally coplanar with the horizontal plane of the contour of the upper portion of said body so as to form a continuation thereof over said passenger compartment, first operating means mounted on said body and operatively connected to one of said panels for movement of said panels between said raised and lowered positions, and second operating means operatively connected to the other of said panels and to said first operating means and operated by said first operating means during raising and lowering movement of said panels for folding and unfolding said other of said panels relative to said one of said panels.

References Cited in the file of this patent

UNITED STATES PATENTS

| | | |
|---|---|---|
| 2,007,873 | Paulin | July 9, 1935 |
| 2,185,581 | Bessonneau | Jan. 2, 1940 |
| 2,686,076 | Helser | Aug. 10, 1954 |
| 2,747,928 | Olivier et al. | Aug. 29, 1956 |
| 2,845,299 | Pickering | July 29, 1958 |